United States Patent
German et al.

(10) Patent No.: US 9,501,381 B2
(45) Date of Patent: Nov. 22, 2016

(54) METHOD AND APPARATUS FOR APPLICATION COSTING BASED ON CLIENT HARDWARE

(75) Inventors: Richard W. German, Carmel, IN (US); Tony E. Thompson, Leo, IN (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 294 days.

(21) Appl. No.: 13/540,136

(22) Filed: Jul. 2, 2012

(65) Prior Publication Data
US 2013/0007129 A1  Jan. 3, 2013

Related U.S. Application Data

(60) Provisional application No. 61/504,018, filed on Jul. 1, 2011.

(51) Int. Cl.
| | | |
|---|---|---|
| G06F 15/177 | (2006.01) | |
| G06F 11/30 | (2006.01) | |
| G06F 11/34 | (2006.01) | |
| G06F 11/32 | (2006.01) | |

(52) U.S. Cl.
CPC ....... *G06F 11/3051* (2013.01); *G06F 11/3031* (2013.01); *G06F 11/3442* (2013.01); *G06F 11/327* (2013.01); *G06F 2201/875* (2013.01)

(58) Field of Classification Search
CPC ... H04L 67/327; H04L 67/32; G06F 9/5044; G06F 9/5027; G06F 9/5011; G06F 9/5005; G06F 9/50; G06F 2221/2141; G06F 11/3051; G06F 11/327; G06F 2201/875; G06F 11/3031; G06F 11/3442
USPC ............ 709/221, 229, 224, 223; 707/1
See application file for complete search history.

(56) References Cited

U.S. PATENT DOCUMENTS

| | | | | |
|---|---|---|---|---|
| 6,393,569 | B1 * | 5/2002 | Orenshteyn | G06F 9/5055 709/203 |
| 8,566,831 | B2 * | 10/2013 | Jellinek | G06F 9/5044 718/102 |
| 2002/0169878 | A1 * | 11/2002 | Orenshteyn | G06F 9/5055 709/227 |
| 2002/0184398 | A1 * | 12/2002 | Orenshteyn | G06F 9/5055 719/310 |
| 2006/0026268 | A1 * | 2/2006 | Sanda | 709/221 |
| 2007/0118496 | A1 * | 5/2007 | Bornhoevd et al. | 707/1 |
| 2008/0104261 | A1 | 5/2008 | Kuno et al. | |
| 2008/0301231 | A1 | 12/2008 | Mehta et al. | |
| 2012/0192191 | A1 * | 7/2012 | Jellinek | G06F 9/5044 718/102 |

OTHER PUBLICATIONS

International Searching Authority, International Search Report and Written Opinion for Application No. PCT/US2012/045281, mailed Sep. 11, 2012, 10 pages, United States Patent and Trademark Office, USA.

* cited by examiner

*Primary Examiner* — Kenneth R Coulter
(74) *Attorney, Agent, or Firm* — Kunzler Law Group

(57) ABSTRACT

Various methods for application costing based on the hardware of a client device are provided. One example method may comprise receiving a message comprising an indication of one or more hardware requirements associated with a service. The method of this example embodiment may further comprise determine one or more hardware attributes related to the one or more hardware requirements. The method of this example embodiment may further comprise evaluating whether the one or more hardware attributes satisfy the one or more hardware requirements. Similar and related example methods, example apparatuses, and example computer program products are also provided.

19 Claims, 6 Drawing Sheets

METHOD AND APPARATUS FOR APPLICATION COSTING BASED ON CLIENT HARDWARE

CROSS-REFERENCE TO RELATED APPLICATIONS

This application claims priority under 35 USC 119 to U.S. Provisional Application No. 61/504,018 filed Jul. 1, 2011, which is incorporated by reference herein in its entirety.

TECHNICAL FIELD

Embodiments of the present invention relate generally to application costing, and, more particularly, relate to a method, apparatus, and computer program product for application costing to improve delivery of services based on the hardware of a client device.

BACKGROUND

The computing industry, over time, has experienced a rapid growth and evolution. Not only have technological advancements led to new models of computing devices, but they have also led to developments in the systems and networks in which the computing devices operate and interact. Each new model of computing device, from mainframes and supercomputers to personal computers and mobile devices, has brought its own share of advantages as well as challenges.

Over the past several decades, computing has been transitioning from distributed systems (e.g. mainframes) to decentralized systems (e.g. personal computers). While the new decentralized, client-oriented personal computer model provided enhanced flexibility and convenience to users, it also resulted in inefficient usage of resources and unnecessary additional costs. For example, each personal computer required the processing power and storage capacity necessary for maximum, rather than typical, loads. As a result, the recent trend in computing has been to a centralized model where applications and data can be centrally managed, stored, and provisioned for the purpose of reducing costs and improving security and efficiency.

One emerging model, known as "the cloud," relies on the delivery of computing resources via a distributed computer network. In such a model, one or more "servers" in the cloud provide services to one or more distributed "clients." Services provided by the cloud may range from individual software applications to the full functionality of an operating system. Cloud systems may have drawbacks, however, such as requiring specialty software to be installed on the client device to enable operation. Such specialty software may limit the availability of the cloud services due to lack of compatibility with the client device or a user lacking privileges for installing the software on the client device.

Additionally, the cloud model faces serious challenges in providing these services to end users in a consistent and secure fashion, particularly given the wide variety of devices, hardware, and operating systems that must be served. In many instances, the configuration and capabilities of the device may not be considered prior to providing service. As a result, some services may be provided that are not compatible with the particular device. For example, a service may be provided to a client that requires more physical memory than the client has available.

Therefore, a need exists in the art for a computing system that considers the capabilities and configuration of the receiving device when determining whether to provision a particular service.

SUMMARY

Methods, apparatuses, and computer program products are herein provided for application costing based on the hardware of a client device. Systems, methods, apparatuses, and computer program products in accordance with various embodiments may provide several advantages to computing devices, computing device users, and network providers. Various embodiments permit an administrator (e.g., a business enterprise or institution) to create a portal environment system for providing controlled and secure access to a private data center configured specifically for supplying services to a set of clients associated with the administrator (e.g., employees of the business enterprise or institution) on the client's personal device regardless of the client device or client's location.

Some example embodiments advantageously allow a portal environment system to make service and application delivery decisions based on the hardware configuration of the client device (i.e. terminal apparatus). In this regard, in accordance with some example embodiments, the hardware configuration of a client device may be evaluated at login to determine what applications and services to make available to a user through the portal interface. In some example embodiments, the hardware configuration of a client device may also be evaluated when deciding whether to deliver to a user a particular requested service or application during a session with the portal environment system.

In an example embodiment, a method is provided, which comprises receiving a message comprising an indication of one or more hardware requirements associated with a service. The method of this example embodiment further comprises determining one or more hardware attributes related to the one or more hardware requirements. The method of this example embodiment may further comprise evaluating whether the one or more hardware attributes satisfy the one or more hardware requirements. The service of this example method may be delivered via a web based portal.

In an example embodiment, a method is provided, which may comprise associating one or more hardware requirements with one or more respective services. The method of this example embodiment may further comprise receiving a request for a service. The method of this example embodiment may further comprise providing for transmission of a message indicating the one or more hardware requirements associated with the requested service. Additionally, the method of this example embodiment may comprise receiving one or more hardware attributes related to the one or more hardware requirements. The method of this example embodiment may further comprise evaluating whether the one or more hardware attributes satisfy the one or more hardware requirements.

BRIEF DESCRIPTION OF THE DRAWING(S)

Having thus described some example embodiments of the invention in general terms, reference will now be made to the accompanying drawings, which are not necessarily drawn to scale, and wherein:

DETAILED DESCRIPTION

Figure 1:
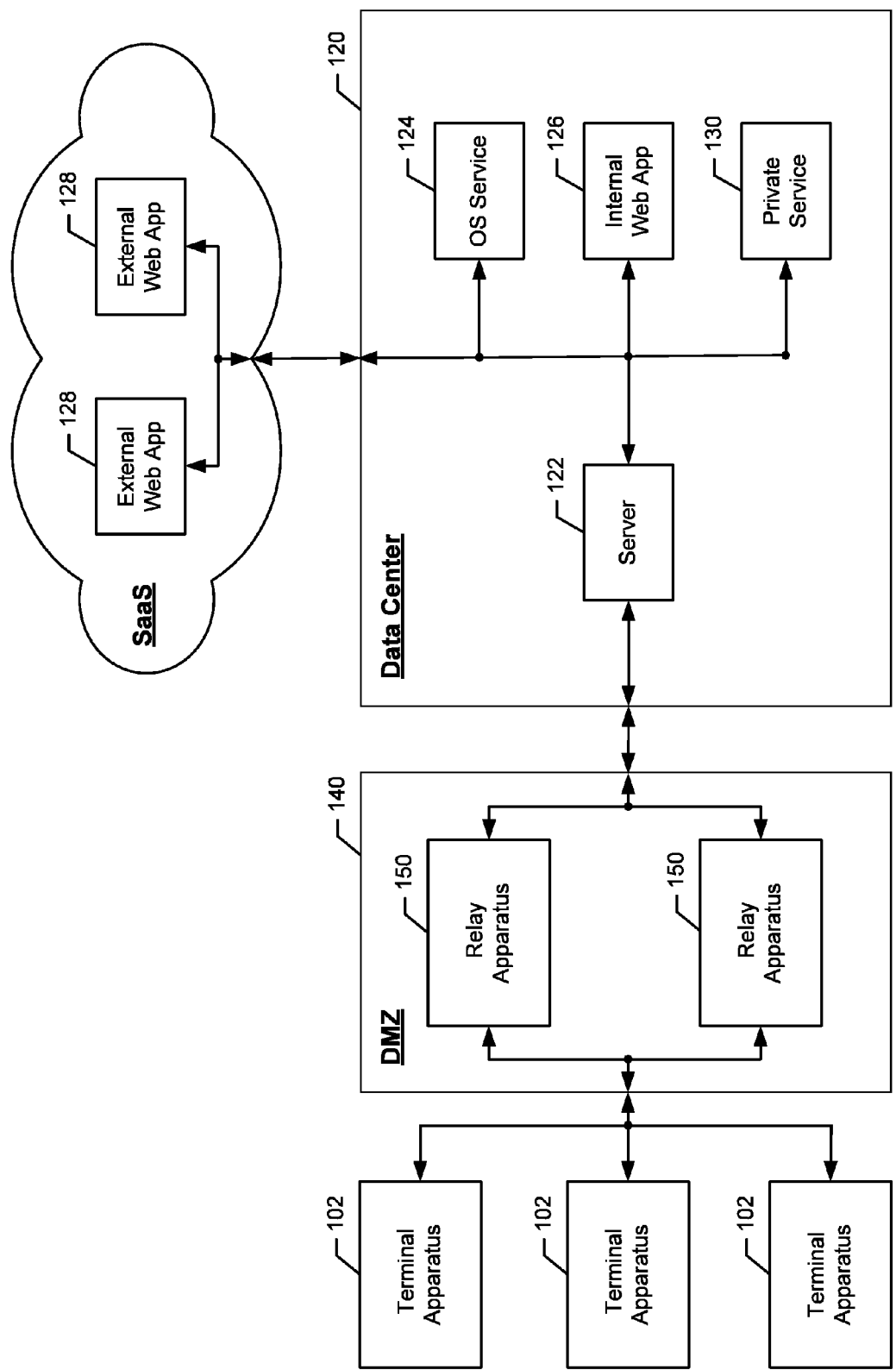
FIG. 1 illustrates a system for application costing based on the hardware of a client device according to some example embodiments of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

Definitions

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of computer-readable media include a floppy disk, a flexible disk, hard disk, magnetic tape, any other magnetic medium, a compact disc read only memory (CD-ROM), compact disc compact disc-rewritable (CD-RW), digital versatile disc (DVD), Blu-Ray, any other optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term 'circuitry' refers to all of the following: (a) hardware-only circuit implementations (such as implementations in only analog and/or digital circuitry); (b) combinations of circuits and software (and/or firmware), such as (as applicable): (i) a combination of processor(s) or (ii) portions of processor(s)/software (including digital signal processor(s)), software, and memory(ies) that work together to cause an apparatus, such as a terminal apparatus, relay apparatus, or server, to perform various functions); and (c) circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, an integrated circuit in a terminal apparatus, relay apparatus, server, or other network device.

System

Referring now to FIG. 1, FIG. 1 illustrates a block diagram of a system 100 for providing web-enabled delivery of a data center through a portal interface, such as a desktop built in a browser on a terminal apparatus 102, according to an example embodiment. It will be appreciated that the system 100 as well as the illustrations in other figures are each provided as an example of one embodiment and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for providing web-enabled delivery of a data center through a portal interface, numerous other configurations may also be used to implement embodiments of the present invention.

In example embodiments, the system 100 may comprise a data center 120. The data center 120 may be configured to operate as a private cloud, public cloud, or a combination private and public cloud. For example, a public cloud may provide services to any user, whereas a private cloud may provide services to a subset of all users (e.g., employees of a particular business enterprise providing the private cloud services). The data center 120 may, in some instances, be protected by a firewall. In some embodiments, the data center 120 may be located on an internal network such as a private local area network (LAN) or the like, or the data center 120 may be remotely located and/or hosted by a third party. In some instances, the data center 120 may comprise a combination of entities and services residing both locally and remotely.

According to some embodiments, the data center 120 may comprise one or more servers 122. A server 122 may be embodied as any computing device, or in some instances may be embodied as a virtual server. A server 122 may also be embodied as a combination of a plurality of computing devices. In this regard, the server 122 may be embodied, for example, as a server cluster and/or may be embodied as a distributed computing system, which may be distributed across a plurality of computing devices. In other embodiments, one or more servers 122 may be embodied on the same computing device.

According to various embodiments, the system 100 may comprise a demilitarized zone (DMZ) 140 located external to the data center 120. In this regard, the DMZ 140 may be located external to the firewall protecting the data center 120. In example embodiments, the DMZ 140 may comprise one or more relay apparatuses 150. A relay apparatus 150 may be embodied as any computing device, such as, for example, a server computer (e.g. a network web server), desktop computer, laptop computer, or the like. In other embodiments, a relay apparatus 150 may be embodied as a virtual relay. According to some embodiments, the relay apparatuses 150 in the DMZ 140 and the data center 120 may be embodied on the same computing device.

The system 100, according to example embodiments, may comprise one or more terminal apparatuses 102. In various embodiments, the one or more terminal apparatuses 102 may be located external to the DMZ 140 and the data center 120. In this regard, the one or more terminal apparatuses 102 may be located external to the firewall protecting the data center 120. A terminal apparatus 102 may be embodied as any computing device, such as, for example, a desktop computer, laptop computer, netbook, tablet, portable digital assistant (PDA), mobile terminal, mobile computer, mobile phone, mobile communication device, smart phone, game device, television device, digital video recorder, positioning device, any combination thereof, and/or the like.

In certain embodiments, a terminal apparatus 102 may be configured to establish a connection with at least one of the one or more relay apparatuses 150 in the DMZ 140. In some embodiments, a terminal apparatus 102 connected to a first relay apparatus 150 may be transferred to a second relay apparatus 150 during the same session. The connection may be established, for example, over the Internet via a transport protocol such as Transmission Control Protocol (TCP), User Datagram Protocol (UDP), or the like. In these embodiments, the connection may be established via an application-specific protocol such as Hypertext Transfer Protocol (HTTP), Hypertext Transfer Protocol Secure (HTTPS), or the like. The connection may be, in certain embodiments, a secure connection. For example, communication over the connection between the terminal apparatus 102 and the relay apparatus 150 may be secured using Transport Layer Security (TLS), Secure Sockets Layer (SSL), or the like. Data transmitted and received over the connection may be encrypted using, for example, 128 bit SSL encryption.

According to various embodiments, a relay apparatus 150 in the DMZ 140 may be configured to establish a connection with at least one of the one or more servers 122 in the data center 120. For example, a relay apparatus 150 may be configured to establish a pipeline connection with a server 122. The pipeline connection may be configured, in example embodiments, to provide bidirectional communication between the relay apparatus 150 and the server 122. For example, the pipeline connection may be a serial connection, Ethernet connection, socket connection, or the like. The pipeline connection may be, in some embodiments, made through one or more ports, for example through a single port in a firewall protecting the data center 120.

A relay apparatus 150, in example embodiments, may serve as an intermediary between one or more terminal apparatuses 102 and one or more servers 122. In this regard, the relay apparatus 150 may serve as a terminal end point for all communications and requests from the terminal apparatus 102 to the data center 120. The relay apparatus 150 may relay the communications and requests from the terminal apparatus 102 to the server 122. Similarly, the relay apparatus 150 may receive all communications to the terminal apparatus 102 originating from the data center 120 via the pipeline connection with the server 122 and relay the communications to the terminal apparatus 102 via the secure connection. In this regard, the server 122 may be configured to communicate with the applications, file systems, and databases inside the data center 120.

According to various embodiments, the combination of the relay apparatus 150 and the server 122 may provide a two-tier architecture for securing the data center 120 from external users, for example a user at a terminal apparatus 102. In this regard, the relay apparatus 150 may provide a first tier of security for the data center 120 while the server 122 may provide a second tier of security for the data center 120. In other embodiments, a terminal apparatus may be configured to connect directly to the server 122 thereby forming a single tier architecture.

According to some embodiments, the data center 120 may be configured to provide information and services to one or more terminal apparatuses 102 via the architecture described above. Examples of the information and services that may be provided by the data center 120, according to certain embodiments, are described in further detail below.

In some embodiments, the data center 120 may be configured to provide operating system specific services 124. For example, the data center 120 may provide Windows™ applications, such as Word™, Excel™, PowerPoint™, or the like. An operating system specific service 124, in certain embodiments, may be delivered by a publishing method. In this regard, the operating system specific service 124 may be remotely delivered from a terminal server (e.g. Microsoft® Terminal Server) running inside the data center 120. In other embodiments, an operating system specific service 124 may be delivered via an application virtualization method. In this regard, the operating system specific service 124 may be bundled in an executable file and deployed dynamically to a terminal apparatus 102 for local processing. In other embodiments, an operating system specific service 124 may refer to a service or application installed locally at the terminal apparatus and directed to be executed by the data center 120.

In example embodiments, the data center 120 may be configured to provide internally hosted web applications 126. In this regard, the internal web applications 126 may be natively integrated into the data center 120. For example, the internal web applications 126 may comprise web applications configured to run over HTTP, HTTPS, or another similar protocol, such as web servers (e.g. Apache, IIS), web portals (e.g. Microsoft SharePoint®, BEA Weblogic®, IBM Websphere®, Oracle PeopleSoft®, Oracle Financials®), content management systems, web consoles, and/or the like. In some embodiments, the internal web applications 126 may be developed in-house or may be developed by third party vendors.

According to various embodiments, the data center 120 may be configured to provide externally hosted web applications 128. The external web applications 128 may comprise, for example, Software as a Service (SaaS) applications. In certain embodiments, an external web application 128 may be hosted by a third party, for example at a remote data center. For example, the external web applications 128 may comprise applications offered by Salesforce.com™, Google Apps™, Microsoft Live™, Zoho™, Moodle™, and/or the like. An external web application 128 may be delivered to the data center 120 via a trusted connection, for example using Security Assertion Markup Language (SAML), delegated authentication, and/or the like. In this regard, the external web applications 128 may be integrated into the data center 120 for delivery to the terminal apparatuses 102 via the servers 122 and, in certain embodiments, relay apparatuses 150.

In some embodiments, the data center 120 may be configured to provide private services 130, such as cloud services. In this regard, the private services 128 may comprise file services, data services, or the like. The file services, in certain embodiments, may provide access to one or more network file systems, for example shared directories, home directories, public directories, and/or the like. The data services, in example embodiments, may provide access to one or more databases. The databases may in some instances be any Open Database Connectivity (ODBC) or Java Database Connectivity (JDBC) database, such as Microsoft SQL (Structured Query Language) Server®, MySQL™, Oracle Database®, IBM DB2®, Microsoft Access®, and/or the like. The databases may be accessible, for example, by web reporting, electronic web forms, and/or the like.

According to various embodiments, the information and services of the data center 120 may be presented to a client or user of a terminal apparatus 102 via a desktop built in a browser. In this regard, the terminal apparatus 102 may be configured to provide a user with access to a web-enabled browser, for example Microsoft Internet Explorer®, Mozilla Firefox®, Google Chrome®, Opera®, Apple Safari®, and/or the like. In example embodiments, the user may be able to access a desktop using the browser of the terminal apparatus 102. In example embodiments, the desktop may be built on web technologies (e.g. Ajax, Comet, and/or the like) and generated natively at the browser in the terminal apparatus 102. In this regard, the desktop built in a browser may have features similar to a traditional desktop, such as menus, taskbars, desktop icons and background, custom settings, shortcuts, system tray, and/or the like. The desktop provided in the browser may be distinct from a traditional desktop provided by the operating system running on the terminal apparatus 102. Additionally, the desktop built in a browser may be distinct from a virtual presentation of a traditional desktop running at an external location, such as inside the data center 120. In some embodiments, the information and services of the data center 120 may be presented to a user of a terminal apparatus 102 via other portal interfaces, for example, a dashboard, mobile interface, tablet interface, or any other portal interface designed to provide access to one or more data center 120 and/or cloud services. Services and information may, in certain embodiments, be delivered directly to a user without the use of a portal interface.

Terminal Apparatus

Figure 2:
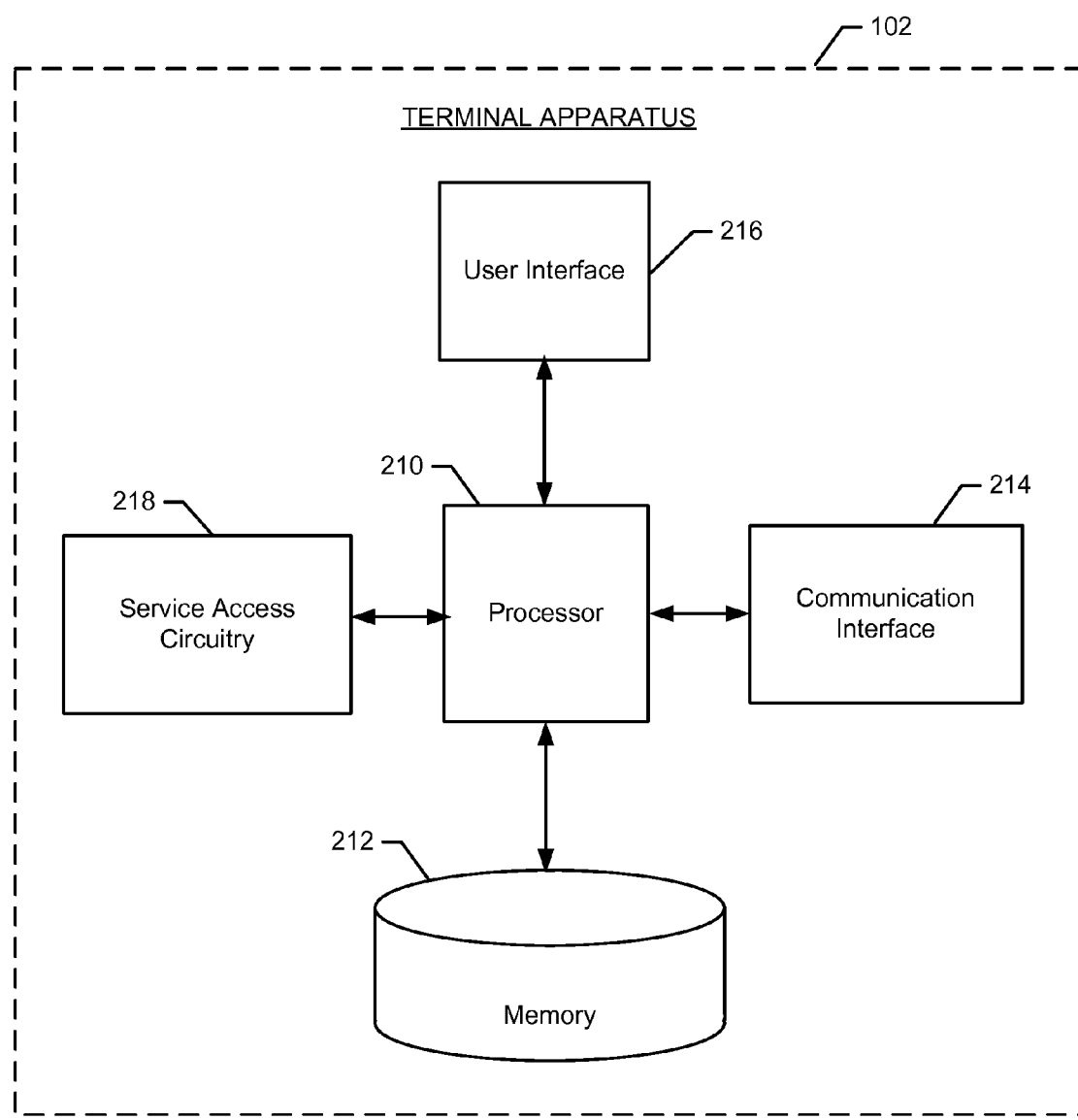
FIG. 2 illustrates a schematic block diagram of a terminal apparatus according to some example embodiments of the present invention.

Referring now to FIG. 2, FIG. 2 illustrates a block diagram of a terminal apparatus 102 according to an example embodiment. In the example embodiment, the terminal apparatus 102 comprises various components for performing the various functions herein described. These components may comprise one or more of a processor 210, memory 212, communication interface 214, user interface 216, or service access circuitry 218. The components of the terminal apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (for example memory 212) that is executable by a suitably configured processing device (e.g., the processor 210), or some combination thereof.

In some example embodiments, one or more of the components illustrated in FIG. 2 may be embodied as a chip or chip set. In other words, the terminal apparatus 102 may comprise one or more physical packages (for example, chips) including materials, components and/or wires on a structural assembly (for example, a baseboard). The structural assembly may provide physical strength, conservation of size, and/or limitation of electrical interaction for component circuitry comprised thereon. In this regard, the processor 210, memory 212, communication interface 214, user interface 216, and/or service access circuitry 218 may be embodied as a chip or chip set. The terminal apparatus 102 may therefore, in some example embodiments, be configured to implement embodiments of the present invention on a single chip or as a single "system on a chip." As another example, in some example embodiments, the terminal apparatus 102 may comprise component(s) configured to implement embodiments of the present invention on a single chip or as a single "system on a chip." As such, in some cases, a chip or chipset may constitute components for performing one or more operations for providing the functionalities described herein and/or for enabling user interface navigation with respect to the functionalities and/or services described herein.

The processor 210 may, for example, be embodied as various components including one or more microprocessors, one or more processors, one or more coprocessors, one or more multi-core processors, one or more controllers, processing circuitry, one or more computers, various other processing elements including integrated circuits, or some combination thereof. Accordingly, although illustrated in FIG. 2 as a single processor, in some embodiments the processor 210 comprises a plurality of processors. The plurality of processors may be in operative communication with each other and may be collectively configured to perform one or more functionalities of the terminal apparatus 102 as described herein. The plurality of processors may be embodied on a single client computing device or distributed across a plurality of client computing devices collectively configured to function as the terminal apparatus 102. In some example embodiments, the processor 210 is configured to execute instructions stored in the memory 212 or otherwise accessible to the processor 210. These instructions, when executed by the processor 210, may cause the terminal apparatus 102 to perform one or more of the functionalities of the terminal apparatus 102 as described herein. As such, whether configured by hardware or software methods, or by a combination thereof, the processor 210 may comprise an entity capable of performing operations according to embodiments of the present invention while configured accordingly. Thus, for example, when the processor 210 is embodied as an executor of instructions, such as may be stored in the memory 212, the instructions may specifically configure the processor 210 to perform one or more algorithms and operations described herein.

The memory 212 may comprise, for example, volatile memory, non-volatile memory, or some combination thereof. In this regard, the memory 212 may comprise one or more tangible and/or non-transitory computer-readable storage media that may comprise volatile and/or non-volatile memory. Although illustrated in FIG. 2 as a single memory, the memory 212 may comprise a plurality of memories. The plurality of memories may be embodied on a single computing device or may be distributed across a plurality of computing devices collectively configured to function as the terminal apparatus 102. In various example embodiments, the memory 212 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 212 may be configured to store information, data, applications, instructions, or the like for enabling the terminal apparatus 102 to carry out various functions in accordance with various example embodiments. For example, in some example embodiments, the memory 212 is configured to buffer input data for processing by the processor 210. Additionally or alternatively, the memory 212 may be configured to store program instructions for execution by the processor 210. The memory 212 may store information in the form of static and/or dynamic information. This stored information may be stored and/or used by the service access circuitry 218 during the course of performing its functionalities.

The communication interface 214 may be embodied as any device or component embodied in circuitry, hardware, a computer program product comprising computer readable program instructions stored on a computer readable medium (for example, the memory 212) and executed by a processing device (for example, the processor 210), or a combination thereof that is configured to receive and/or transmit data from/to another computing device. In an example embodiment, the communication interface 214 is at least partially embodied as or otherwise controlled by the processor 210. In this regard, the communication interface 214 may be in communication with the processor 210, such as via a bus. The communication interface 214 may comprise, for example, a network card (e.g. wired or wireless), an antenna, a transmitter, a receiver, and/or supporting hardware or software for enabling communications with one or more remote computing devices. The communication interface 214 may be configured to receive and/or transmit data using any protocol that may be used for communications between computing devices. In this regard, the communication interface 214 may be configured to receive and/or transmit data using any protocol that may be used for transmission of data over a wireless network, wireline network, some combination thereof, or the like by which the terminal apparatus 102 and one or more computing devices or computing resources may be in communication. As an example, the communication interface 214 may be configured to enable communication between the terminal apparatus 102 and another device, such as a relay apparatus 150 or a server 122. The communication interface 214 may additionally be in communication with the memory 212, user interface 216, and/or service access circuitry 218, such as via a bus.

The user interface 216 may be in communication with the processor 210 to receive an indication of a user input and/or to provide an audible, visual, mechanical, or other output to a user. As such, the user interface 216 may comprise, for example, a keyboard, a mouse, a joystick, a display, a touch screen display, a microphone, a speaker, and/or other input/output mechanisms. In embodiments wherein the user interface 216 comprises a touch screen display, the user interface 216 may additionally be configured to detect and/or receive indication of a touch gesture or other input to the touch screen display. The user interface 216 may be in communication with the memory 212, communication interface 214, and/or service access circuitry 218, such as via a bus.

The service access circuitry 218 may be embodied as various components, such as circuitry, hardware, a computer program product comprising computer readable program instructions stored on a computer readable medium (for example, the memory 212) and executed by a processing device (for example, the processor 210), or some combination thereof and, in some embodiments, is embodied as or otherwise controlled by the processor 210. In embodiments wherein the service access circuitry 218 is embodied separately from the processor 210, the service access circuitry 218 may be in communication with the processor 210. The service access circuitry 218 may further be in communication with one or more of the memory 212, communication interface 214, or user interface 216, such as via a bus.

According to various embodiments, the service access circuitry 218 may be configured to receive a request from a user to log on to a portal environment system, such as a web based portal, to gain access to, for example, a data center. The portal interface may be, for example, a desktop in a browser, dashboard, mobile interface, tablet interface, or any other portal interface designed to provide access to one or more data center and/or cloud services. The service access circuitry 218 may be configured to provide for transmission of a login request to a server 122 associated with the data center, in some instances via a relay apparatus 150. The login request may be, for example, in the form of an HTTP POST command. In example embodiments, prior to transmitting the login request, the service access circuitry 218 may be configured to determine information related to the hardware of the terminal apparatus 102 associated with the service access circuitry 218. In this regard, the determined hardware information (e.g., one or more hardware attributes) may be included in the login request. The hardware information may be contained in a text string within the login request, for example, a serialized text string representing a JavaScript Object Notation (JSON) object.

In example embodiments, the service access circuitry 218 may be configured to receive configuration information for the portal interface from the server 122. The configuration information may indicate one or more services to make available to the user. In this regard, a service may refer to any service or application to which access is provided through the portal environment system, whether located on the terminal apparatus 102 associated with the service access circuitry 218, in the data center, or on a remote entity. The one or more services indicated may be determined by the server 122 based at least in part on the hardware information provided by the service access circuitry 218. In this regard, if the hardware information of the terminal apparatus 102 associated with the service access circuitry 218 does not meet the hardware requirements of a particular service, that service may be restricted and therefore not made available to the user. In certain embodiments, the configuration information may not restrict all services for which the hardware requirements are not met at login. In this regard, the configuration information may initially restrict those services whose hardware requirements are related to hardware information of the terminal apparatus 102 that remains static throughout a session, such as video card type, total installed memory, or the like. The configuration information may not restrict those services whose hardware requirements are related to hardware information that may change during a session, such as network connection type, power source, or the like.

According to various embodiments, the service access circuitry 218 may be configured to provide for display of the portal interface to the user. In this regard, the portal interface may comprise a representation of the one or more services indicated by the configuration information sent by the server 122. The portal interface may exclude services and applications restricted by the server 122 based on the hardware information. For example, in embodiments where the portal interface is embodied as a desktop in a browser, restricted services and applications may not have associated icons displayed on the desktop or associated start menu.

In certain embodiments, a user may select a service or application provided by the portal environment system for delivery, for example, by selecting a service from the portal interface. The service access circuitry 218 may be configured to provide for transmission to the server 122 of a request for access to the desired service, in some instances via a relay apparatus 150. In some embodiments, the desired service may be stored locally on the terminal apparatus 102 associated with the service access circuitry 218. In response, the service access circuitry 218 may receive one or more requirements associated with the service. The one or more requirements may be based at least in part on conditions related to the hardware of the terminal apparatus 102 associated with the service access circuitry 218. In example embodiments, a requirement may indicate a hardware condition necessary to obtain access to the desired service, for example the requirement may indicate that the terminal apparatus 102 must have a wired connection to the Internet. In other embodiments, a requirement may indicate a hardware condition that would lead to restriction of the desired service, for example the requirement may indicate that the terminal apparatus 102 must not be operating on battery power alone.

According to various embodiments, the service access circuitry 218 may be configured to determine hardware information related to the terminal apparatus 102 associated with the service access circuitry 218. In this regard, the service access circuitry 218 may be configured to determine the particular hardware information necessary to evaluate the conditions of the one or more requirements of a service. For example, if a condition for a particular service requires that the terminal apparatus 102 must have a wired network connection, the service access circuitry 218 may be configured to determine the network connection status of the terminal apparatus 102.

In example embodiments, the service access circuitry 218 may be configured to determine the hardware information of the terminal apparatus 102 via one or more hardware information requests. In this regard, the service access circuitry 218 may be configured to communicate with one or more hardware devices associated with the terminal apparatus 102. The hardware request may occur via an application programming interface (API) provided by a software development kit (SDK) associated with one or more of the hardware devices. For example, a hardware request may be made via a JavaScript function call, for example from within an Internet browser or a desktop built in a browser portal interface. In some embodiments, each hardware request corresponds to a single item of hardware information. In other embodiments, a single hardware request may correspond to more than one item of hardware information. Various examples of the hardware information that may be obtained through a hardware request include: current central processing unit (CPU) utilization, maximum average CPU utilization, chipset, chip support for one time password (OTP), charging status, power source (i.e. battery or power cord), battery charge percentage, battery time remaining, current memory usage, current memory available, total memory installed, available hard drive space, total hard drive space, network bandwidth, network connection type (i.e. wired or wireless), video card model, current screen resolution, maximum screen resolution, supported screen resolutions, mouse availability, keyboard availability, speaker availability, microphone availability, or the like.

According to example embodiments, the service access circuitry 218 may be configured to evaluate the conditions of the one or more requirements of a service based at least in part on the determined hardware information. In this regard, the service access circuitry 218 may be configured to compare the hardware information of the terminal apparatus 102 associated with the service access circuitry 218 with the conditions of the one or more requirements associated with a particular service. In some embodiments, the service access circuitry 218 may determine that the hardware of the terminal apparatus 102 meets the requirements of the service. In these embodiments, the service access circuitry 218 may be configured to provide access to the service. In other embodiments, the service access circuitry 218 may determine that the hardware of the terminal apparatus 102 does not meet the requirements of the service. In these embodiments, the service access circuitry 218 may restrict access to the service.

In embodiments where the service access circuitry 218 restricts access to a service, the service access circuitry 218 may be configured to provide for display of a notification to the user that the service is temporarily or permanently restricted due to the hardware of the terminal apparatus 102. The notification may indicate the hardware requirement not met by the terminal apparatus 102 that led to the restriction.

According to certain embodiments, a condition of the hardware requirement may be a static hardware condition that may not be altered during a session with the portal environment system. For example, the hardware requirement may indicate that a particular chipset is necessary for access to the requested service. In this regard, a user may not be able to resolve the issue by changing the chipset of the terminal apparatus 102 during the session. To gain access to the requested service, a user may be required to log out of the session, resolve the issue, and re-attempt to log on. The user may also log out of the session and attempt to log on from a different terminal apparatus 102 having the appropriate hardware required for the requested service.

In other embodiments, a condition of the hardware requirement may not be a static hardware condition, for example, the service may require that the terminal apparatus 102 have a wired network connection. In these instances, the service access circuitry 218 may be configured to cause display of a warning notification to the user indicating the non-static condition of the hardware requirement that is preventing the user from accessing the service. The user may, in response, adjust the non-static condition to meet the hardware requirement. In accordance with the example discussed above, the user may establish a wired network connection to the terminal apparatus 102 to meet the wired network connection requirement. The user may then provide an indication to the service access circuitry 218 that the condition has been adjusted to meet the hardware requirement, for example by selecting a retry option in the warning notification display. In some instances, the user may be permitted to override the restriction, for example by selecting an override option on a warning notification display.

According to various embodiments, the service access circuitry 218 may be configured to provide for transmission of a report to the server 122 indicating whether the terminal apparatus 102 has met all of the conditions for the requirements associated with the service. In embodiments where the requirements have been met, the report may request that the server 122 allow access to the service. In other embodiments where one or more requirements have not been met, the report may request that the server restrict access to the service.

In some example embodiments, the service access circuitry 218 may not be configured to evaluate the conditions of the one or more requirements of a service based at least in part on the determined hardware information. Rather, in these embodiments, the server 122 may be configured to evaluate the requirements. In this regard, the service access circuitry 218 may be configured to provide for transmission of the determined hardware information to the server for the server to evaluate. The service access circuitry 218 may be configured to receive an indication from the server 122 identifying whether the hardware of the terminal apparatus 102 associated with the service access circuitry 218 meets the requirements for the service. In embodiments where the hardware of the terminal apparatus 102 meets the requirements, the service access circuitry 218 may be configured to allow access to the requested service. In other embodiments where the hardware of the terminal apparatus 102 does not meet the requirements, the service access circuitry 218 may be configured to restrict the service or provide a warning notification to the user regarding a temporary restriction as described above.

According to various embodiments, the service access circuitry 218 may be configured to evaluate the hardware information of the terminal apparatus 102 at any time. In this regard, the service access circuitry 218 may not be limited to evaluating the hardware information of the terminal apparatus 102 when logging on to a portal environment system or when selecting applications for delivery during a session. For example, the service access circuitry 218 may be configured to evaluate the hardware information of the terminal apparatus 102 in response to an auditing event or other similar trigger.

Server

Figure 3:
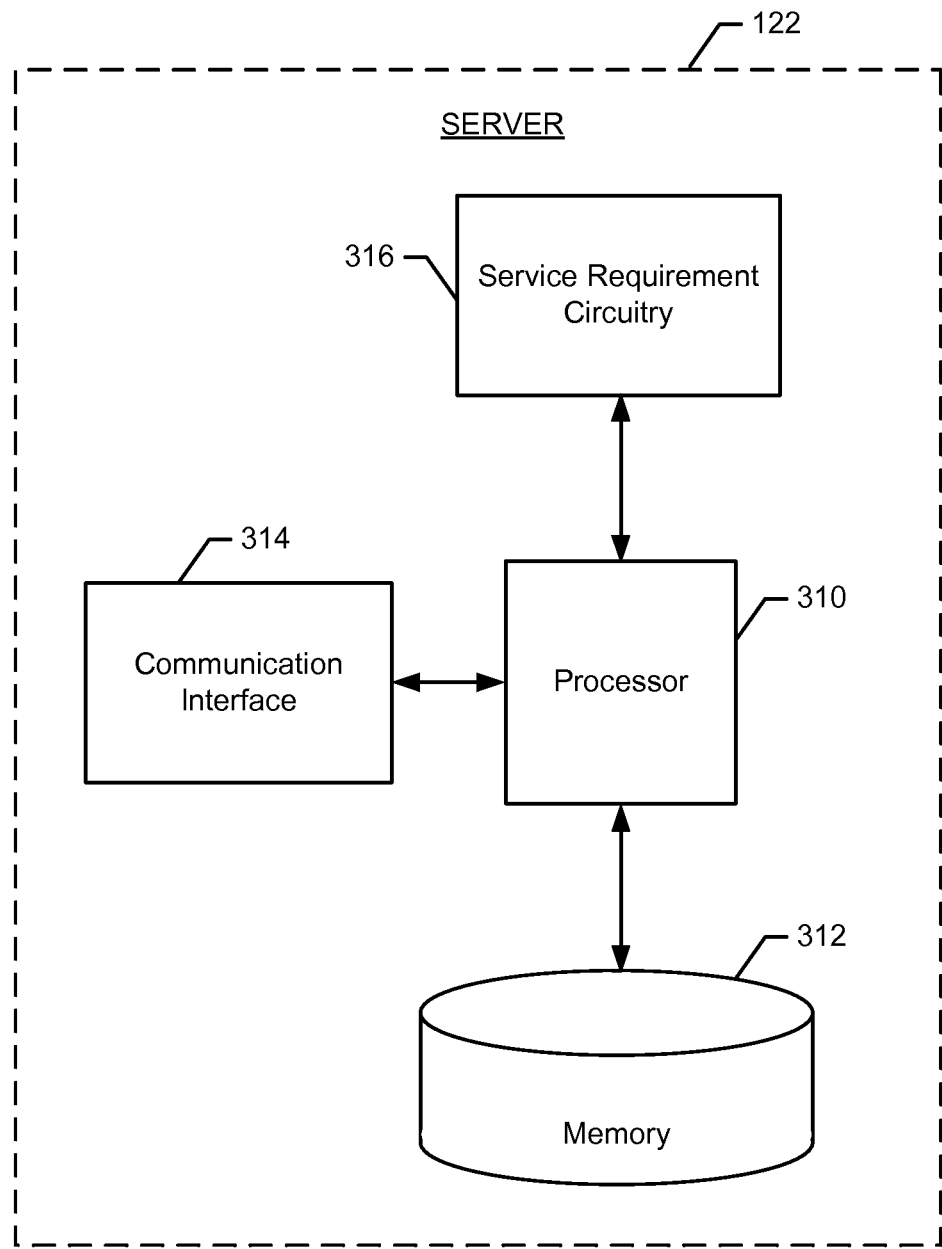
FIG. 3 illustrates a block diagram of a server according to some example embodiments of the present invention.

Referring now to FIG. 3, FIG. 3 illustrates a block diagram of a server 122 according to an example embodiment. In the example embodiment, the server 122 comprises various components for performing the various functions herein described. These components may comprise one or more of a processor 310, memory 312, communication interface 314, or service requirement circuitry 316. The components of the server 122 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (for example memory 312) that is executable by a suitably configured processing device (e.g., the processor 310), or some combination thereof.

In some example embodiments, one or more of the components illustrated in FIG. 3 may be embodied as a chip or chip set. In other words, the server 122 may comprise one or more physical packages (for example, chips) including materials, components and/or wires on a structural assembly (for example, a baseboard). The structural assembly may provide physical strength, conservation of size, and/or limitation of electrical interaction for component circuitry comprised thereon. In this regard, the processor 310, memory 312, communication interface 314, and/or service requirement circuitry 316 may be embodied as a chip or chip set. The server 122 may therefore, in some example embodiments, be configured to implement embodiments of the present invention on a single chip or as a single "system on a chip." As another example, in some example embodiments, the server 122 may comprise component(s) configured to implement embodiments of the present invention on a single chip or as a single "system on a chip." As such, in some cases, a chip or chipset may constitute components for performing one or more operations for providing the functionalities described herein.

The processor 310 may, for example, be embodied as various components including one or more microprocessors, one or more processors, one or more coprocessors, one or more multi-core processors, one or more controllers, processing circuitry, one or more computers, various other processing elements including integrated circuits, or some combination thereof. Accordingly, although illustrated in FIG. 3 as a single processor, in some embodiments the processor 310 comprises a plurality of processors. The plurality of processors may be in operative communication with each other and may be collectively configured to perform one or more functionalities of the server 122 as described herein. The plurality of processors may be embodied on a single computing device or distributed across a plurality of computing devices collectively configured to function as the server 122. In some example embodiments, the processor 310 is configured to execute instructions stored in the memory 312 or otherwise accessible to the processor 310. These instructions, when executed by the processor 310, may cause the server 122 to perform one or more of the functionalities of the server 122 as described herein. As such, whether configured by hardware or software methods, or by a combination thereof, the processor 310 may comprise an entity capable of performing operations according to embodiments of the present invention while configured accordingly. Thus, for example, when the processor 310 is embodied as an executor of instructions, such as may be stored in the memory 312, the instructions may specifically configure the processor 310 to perform one or more algorithms and operations described herein.

The memory 312 may comprise, for example, volatile memory, non-volatile memory, or some combination thereof. In this regard, the memory 312 may comprise one or more tangible and/or non-transitory computer-readable storage media that may comprise volatile and/or non-volatile memory. Although illustrated in FIG. 3 as a single memory, the memory 312 may comprise a plurality of memories. The plurality of memories may be embodied on a single computing device or may be distributed across a plurality of computing devices collectively configured to function as the server 122. In various example embodiments, the memory 312 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 312 may be configured to store information, data, applications, instructions, or the like for enabling the server 122 to carry out various functions in accordance with various example embodiments. For example, in some example embodiments, the memory 312 is configured to buffer input data for processing by the processor 310. Additionally or alternatively, the memory 312 may be configured to store program instructions for execution by the processor 310. The memory 312 may store information in the form of static and/or dynamic information. This stored information may be stored and/or used by the service requirement circuitry 316 during the course of performing its functionalities.

The communication interface 314 may be embodied as any device or component embodied in circuitry, hardware, a computer program product comprising computer readable program instructions stored on a computer readable medium (for example, the memory 312) and executed by a processing device (for example, the processor 310), or a combination thereof that is configured to receive and/or transmit data from/to another computing device. In an example embodiment, the communication interface 314 is at least partially embodied as or otherwise controlled by the processor 310. In this regard, the communication interface 314 may be in communication with the processor 310, such as via a bus. The communication interface 314 may comprise, for example, a network card (e.g. wired or wireless), an antenna, a transmitter, a receiver, and/or supporting hardware or software for enabling communications with one or more remote computing devices. The communication interface 314 may be configured to receive and/or transmit data using any protocol that may be used for communications between computing devices. In this regard, the communication interface 314 may be configured to receive and/or transmit data using any protocol that may be used for transmission of data over a wireless network, wireline network, some combination thereof, or the like by which the server 122 and one or more computing devices or computing resources may be in communication. As an example, the communication interface 314 may be configured to enable communication between the server 122 and another device, such as a relay apparatus 150 or a terminal apparatus 102. The communication interface 314 may additionally be in communication with the memory 312 and/or service requirement circuitry 316, such as via a bus.

The service requirement circuitry 316 may be embodied as various components, such as circuitry, hardware, a computer program product comprising computer readable program instructions stored on a computer readable medium (for example, the memory 312) and executed by a processing device (for example, the processor 310), or some combination thereof and, in some embodiments, is embodied as or otherwise controlled by the processor 310. In embodiments wherein the service requirement circuitry 316 is embodied separately from the processor 310, the service requirement circuitry 316 may be in communication with the processor 310. The service requirement circuitry 316 may further be in communication with one or more of the memory 312 and/or communication interface 314, such as via a bus.

According to various embodiments, the service requirement circuitry 316 may be configured to associate one or more hardware requirements with one or more services or applications provided by the data center. In this regard, the service requirement circuitry 316 may be configured to allow an administrator to assign a hardware requirement to a service, for example through an administrative management interface. The hardware requirements may be related to any of the items of hardware information described above with respect to the terminal apparatus 102. The service requirement circuitry 316 may be configured to provide for storage of the one or more hardware requirements for each of the one or more services or applications provided by the data center 120.

In some embodiments, the service requirement circuitry 316 may be configured to receive a request for access to a service or application from a terminal apparatus 102. The request may be received, in example embodiments, in response to a user requesting a particular service. In other embodiments, the request may be associated with a request from a user to log on to a web based portal provided by the server 122 associated with the service requirement circuitry 316. The service requirement circuitry 316 may determine the one or more hardware requirements for the requested service. In this regard, the service requirement circuitry 316 may be configured to retrieve the hardware requirements from storage. In some embodiments, the service requirement circuitry 316 may be configured to provide for transmission of the one or more hardware requirements to the terminal apparatus 102. The service requirement circuitry 316 may additionally, in certain embodiments, provide for transmission of the requested service. In other embodiments, the service requirement circuitry 316 may be configured not to provide the requested service prior to confirmation that the hardware requirements are met by the terminal apparatus 102.

According to various embodiments, the service requirement circuitry 316 may be configured to receive hardware information related to the terminal apparatus 102. The service requirement circuitry 316 may, in some instances, provide for storage of the hardware information, for example as part of the session with the terminal apparatus 102. The hardware information may be related to the one or more hardware requirements associated with the requested service. In example embodiments, the service requirement circuitry 316 may be configured to evaluate the hardware requirements based at least in part on the received hardware information of the terminal apparatus 102. The service requirement circuitry 316 may provide for transmission of a response to the terminal apparatus 102 indicating whether the hardware of the terminal apparatus 102 meets the requirements for the requested application. In embodiments where the hardware requirements are met, the service requirement circuitry 316 may deliver the service to the terminal apparatus 102 or, in instances where the service has previously been delivered or is locally available at the terminal apparatus 102, provide for transmission of a message to the terminal apparatus 102 authorizing access to the service. In embodiments where the hardware requirements are not met, the service requirement circuitry 316 may be configured to restrict access to the requested service.

In embodiments where the terminal apparatus 102, rather than the service requirement circuitry 316, evaluates the hardware requirements of the service, the service requirement circuitry 316 may be configured to receive an indication of whether the hardware of the terminal apparatus 102 meets the hardware requirements of the service. In these embodiments, the service requirement circuitry 316 may proceed with delivering, authorizing, or restricting the requested service, as discussed above.

Relay Apparatus

Figure 4:
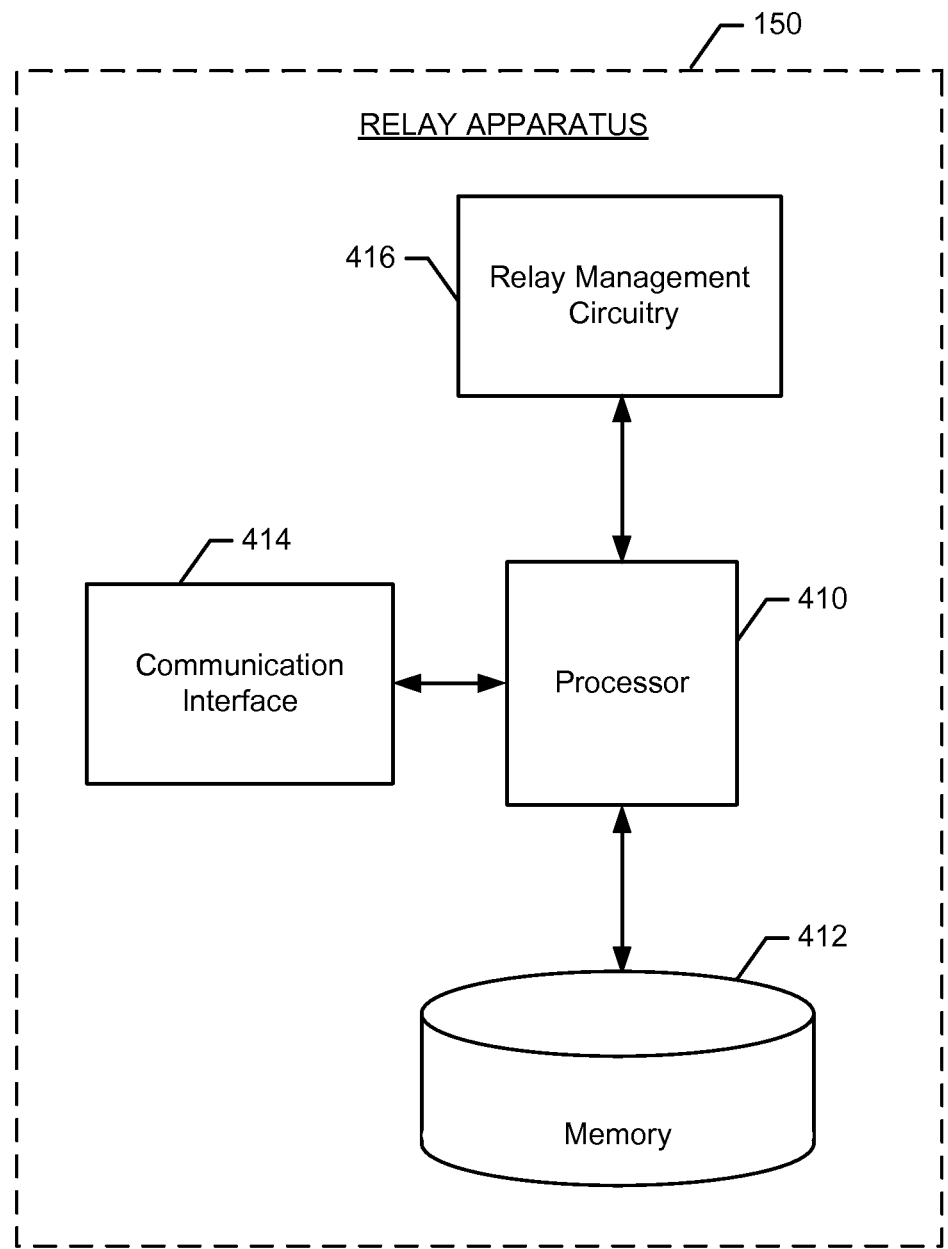
FIG. 4 illustrates a block diagram of a relay apparatus according to some example embodiments of the present invention.

Referring now to FIG. 4, FIG. 4 illustrates a block diagram of a relay apparatus 150 according to an example embodiment. In the example embodiment, the relay apparatus 150 comprises various components for performing the various functions herein described. These components may comprise one or more of a processor 410, memory 412, communication interface 414, or relay management circuitry 416. The components of the relay apparatus 150 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (for example memory 412) that is executable by a suitably configured processing device (e.g., the processor 410), or some combination thereof.

In some example embodiments, one or more of the components illustrated in FIG. 4 may be embodied as a chip or chip set. In other words, the relay apparatus 150 may comprise one or more physical packages (for example, chips) including materials, components and/or wires on a structural assembly (for example, a baseboard). The structural assembly may provide physical strength, conservation of size, and/or limitation of electrical interaction for component circuitry comprised thereon. In this regard, the processor 410, memory 412, communication interface 414, and/or relay management circuitry 416 may be embodied as a chip or chip set. The relay apparatus 150 may therefore, in some example embodiments, be configured to implement embodiments of the present invention on a single chip or as a single "system on a chip." As another example, in some example embodiments, the relay apparatus 150 may comprise component(s) configured to implement embodiments of the present invention on a single chip or as a single "system on a chip." As such, in some cases, a chip or chipset may constitute components for performing one or more operations for providing the functionalities described herein.

The processor 410 may, for example, be embodied as various components including one or more microprocessors, one or more processors, one or more coprocessors, one or more multi-core processors, one or more controllers, processing circuitry, one or more computers, various other processing elements including integrated circuits, or some combination thereof. Accordingly, although illustrated in FIG. 4 as a single processor, in some embodiments the processor 410 comprises a plurality of processors. The plurality of processors may be in operative communication with each other and may be collectively configured to perform one or more functionalities of the relay apparatus 150 as described herein. The plurality of processors may be embodied on a single computing device or distributed across a plurality of computing devices collectively configured to function as the relay apparatus 150. In some example embodiments, the processor 410 is configured to execute instructions stored in the memory 412 or otherwise accessible to the processor 410. These instructions, when executed by the processor 410, may cause the relay apparatus 150 to perform one or more of the functionalities of the relay apparatus 150 as described herein. As such, whether configured by hardware or software methods, or by a combination thereof, the processor 410 may comprise an entity capable of performing operations according to embodiments of the present invention while configured accordingly. Thus, for example, when the processor 410 is embodied as an executor of instructions, such as may be stored in the memory 412, the instructions may specifically configure the processor 410 to perform one or more algorithms and operations described herein.

The memory 412 may comprise, for example, volatile memory, non-volatile memory, or some combination thereof. In this regard, the memory 412 may comprise one or more tangible and/or non-transitory computer-readable storage media that may comprise volatile and/or non-volatile memory. Although illustrated in FIG. 4 as a single memory, the memory 412 may comprise a plurality of memories. The plurality of memories may be embodied on a single computing device or may be distributed across a plurality of computing devices collectively configured to function as the relay apparatus 150. In various example embodiments, the memory 412 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 412 may be configured to store information, data, applications, instructions, or the like for enabling the relay apparatus 150 to carry out various functions in accordance with various example embodiments. For example, in some example embodiments, the memory 412 is configured to buffer input data for processing by the processor 410. Additionally or alternatively, the memory 412 may be configured to store program instructions for execution by the processor 410. The memory 412 may store information in the form of static and/or dynamic information. This stored information may be stored and/or used by the relay management circuitry 416 during the course of performing its functionalities.

The communication interface 414 may be embodied as any device or component embodied in circuitry, hardware, a computer program product comprising computer readable program instructions stored on a computer readable medium (for example, the memory 412) and executed by a processing device (for example, the processor 410), or a combination thereof that is configured to receive and/or transmit data from/to another computing device. In an example embodiment, the communication interface 414 is at least partially embodied as or otherwise controlled by the processor 410. In this regard, the communication interface 414 may be in communication with the processor 410, such as via a bus. The communication interface 414 may comprise, for example, a network card (e.g. wired or wireless), an antenna, a transmitter, a receiver, and/or supporting hardware or software for enabling communications with one or more remote computing devices. The communication interface 414 may be configured to receive and/or transmit data using any protocol that may be used for communications between computing devices. In this regard, the communication interface 414 may be configured to receive and/or transmit data using any protocol that may be used for transmission of data over a wireless network, wireline network, some combination thereof, or the like by which the relay apparatus 150 and one or more computing devices or computing resources may be in communication. As an example, the communication interface 414 may be configured to enable communication between the relay apparatus 150 and another device, such as a terminal apparatus 102 or server 122. The communication interface 414 may additionally be in communication with the memory 412 and/or relay management circuitry 416, such as via a bus.

The relay management circuitry 416 may be embodied as various components, such as circuitry, hardware, a computer program product comprising computer readable program instructions stored on a computer readable medium (for example, the memory 412) and executed by a processing device (for example, the processor 410), or some combination thereof and, in some embodiments, is embodied as or otherwise controlled by the processor 410. In embodiments wherein the relay management circuitry 416 is embodied separately from the processor 410, the relay management circuitry 416 may be in communication with the processor 410. The relay management circuitry 416 may further be in communication with one or more of the memory 412 and/or communication interface 414, such as via a bus.

According to various embodiments, the relay management circuitry 416 may be configured to relay information between a first entity, for example a terminal apparatus 102, and a second entity, for example a server 122. In this regard, the relay management circuitry 416 may be configured to receive communications from a terminal apparatus 102 that are intended for a server 122. The relay management circuitry 416 may provide for transmission of the received communications to the server 122. Similarly, the relay management circuitry 416 may be configured to receive communications from the server 122 intended for the terminal apparatus 102 and to send the communications to the terminal apparatus 102.

EXAMPLES

The following provides a non-limiting example of one embodiment and should not be construed to narrow the scope or spirit of the disclosure in any way. In this example, a user attempts to open Skype® video calling through a desktop-in-a-browser portal environment system via a web browser running on the user's laptop. The web browser sends a request for delivery of the Skype® service to a server in the portal environment system. The server has previously associated a hardware requirement with the Skype® service, namely the server requires that the user's laptop has a wired network connection due to the high network demands of video calling. Thus, the server sends a message to the user's desktop-in-a-browser indicating that a wired network connection is required for delivery of the Skype® service. The desktop-in-a-browser then determines the type of network connection currently established by the user's laptop. In this example, the user's current network connection is wireless, rather than wired. Therefore, upon evaluating the network connection requirement sent by the server, the desktop-in-a-browser may determine that the laptop is not presently configured for the requested Skype® video calling service.

According to this example, the desktop-in-a-browser may display an alert to the user explaining that a wired network connection is required for the requested service. In response, the user may establish a wired connection on the laptop and repeat the process described above. Upon evaluating the requirement at this point, the desktop-in-a-browser may determine that the user's laptop now has a wired network connection, which satisfies the requirement, and deliver the requested Skype® video calling service to the user.

Figure 5:
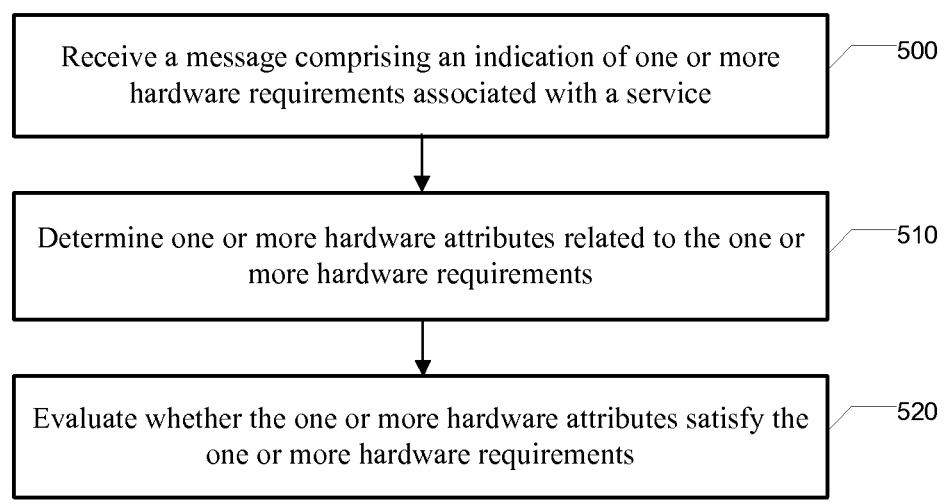
FIG. 5 illustrates a flowchart according to an example method for application costing based on the hardware of a client device according to some example embodiments of the present invention.

FIG. 5 illustrates a flowchart according to an example method for application costing to improve delivery of services based on the hardware of a client device according to an example embodiment. In this regard, FIG. 5 illustrates operations that may be performed at a terminal apparatus 102. The operations illustrated in and described with respect to FIG. 5 may, for example, be performed by, with the assistance of, and/or under the control of the processor 210, memory 212, communication interface 214, user interface 216, or service access circuitry 218. Operation 500 may comprise receiving a message comprising an indication of one or more hardware requirements associated with a service. The processor 210, memory 212, communication interface 214, user interface 216, or service access circuitry 218 may, for example, provide structure for performing operation 500. Operation 510 may comprise determining one or more hardware attributes related to the one or more hardware requirements. The processor 210, memory 212, communication interface 214, user interface 216, or service access circuitry 218 may, for example, provide structure for performing operation 510. Operation 520 may comprise evaluating whether the one or more hardware attributes satisfy the one or more hardware requirements. The processor 210, memory 212, communication interface 214, user interface 216, or service access circuitry 218 may, for example, provide structure for performing operation 520.

Figure 6:
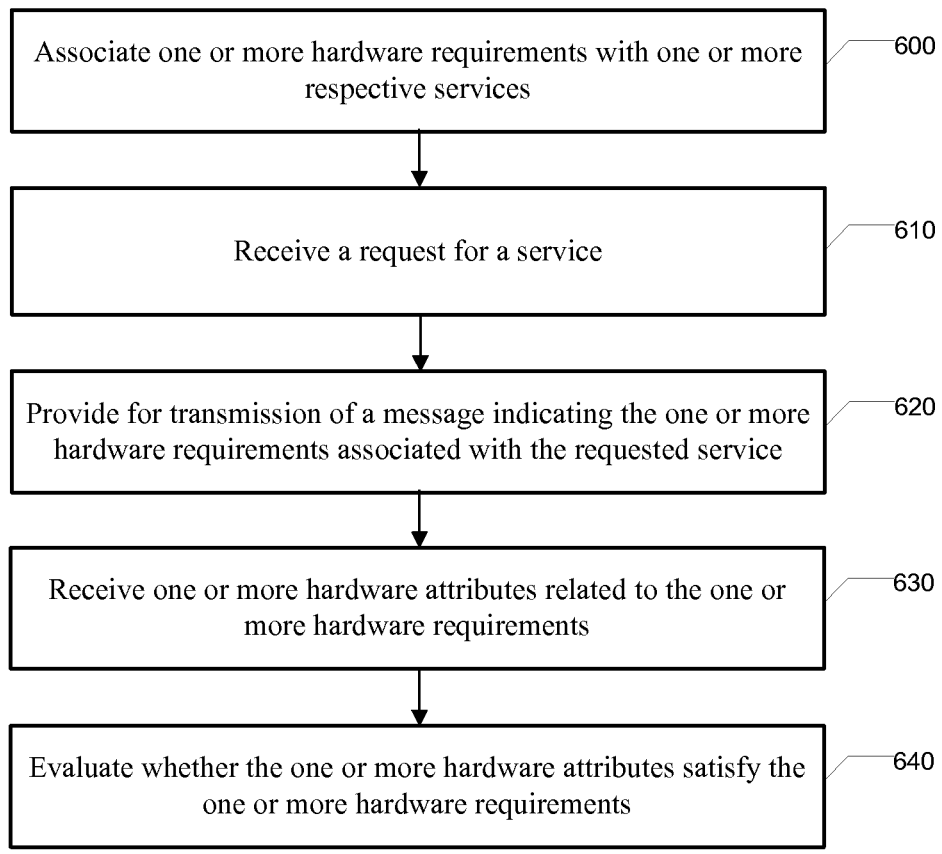
FIG. 6 illustrates a flowchart according to an example method for application costing based on the hardware of a client device according to some example embodiments of the present invention.

FIG. 6 illustrates a flowchart according to another example method for application costing to improve delivery of services based on the hardware of a terminal apparatus or client device according to an example embodiment. In this regard, FIG. 6 illustrates operations that may be performed at a server 122. The operations illustrated in and described with respect to FIG. 6 may, for example, be performed by, with the assistance of, and/or under the control of one or more of the processor 310, memory 312, communication interface 314, or service requirement circuitry 316. Operation 600 may comprise associating one or more hardware requirements with one or more respective services. The processor 310, memory 312, communication interface 314, or service requirement circuitry 316 may, for example, provide structure for performing operation 600. Operation 610 may comprise receiving a request for a service. The processor 310, memory 312, communication interface 314, or service requirement circuitry 316 may, for example, provide structure for performing operation 610. Operation 620 may comprise providing for transmission of a message indicating the one or more hardware requirements associated with the requested service. The processor 310, memory 312, communication interface 314, or service requirement circuitry 316 may, for example, provide structure for performing operation 620. Operation 630 may comprise receiving one or more hardware attributes related to the one or more hardware requirements. The processor 310, memory 312, communication interface 314, or service requirement circuitry 316 may, for example, provide structure for performing operation 630. Operation 640 may comprise evaluating whether the one or more hardware attributes satisfy the one or more hardware requirements. The processor 310, memory 312, communication interface 314, or service requirement circuitry 316 may, for example, provide structure for performing operation 640.

FIGS. 5-6 each illustrate a flowchart of a system, method, and computer program product according to example embodiments of the invention. It will be understood that each block of the flowchart, and combinations of blocks in the flowchart, may be implemented by various means, such as hardware and/or a computer program product comprising one or more computer-readable mediums (as opposed to a computer-readable transmission medium which describes a propagating signal) having one or more computer program code instructions, program instructions, or executable computer-readable program code instructions stored therein. For example, one or more of the procedures described herein may be embodied by computer program instructions of a computer program product. In this regard, the computer program product(s) that embodies the procedures described herein may be stored by one or more memory devices (e.g., memory 212, memory 312, or memory 412) of a terminal apparatus, server, relay apparatus, or other computing device (e.g., the terminal apparatus 102) and executed by a processor (e.g., the processor 210, processor 310, or processor 410) in the computing device. In some embodiments, the computer program instructions comprising the computer program product(s) that embodies the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s).

Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together.

Accordingly, execution of instructions associated with the operations of the flowchart by a processor, or storage of instructions associated with the blocks or operations of the flowchart in a computer-readable storage medium, supports combinations of operations for performing the specified functions. It will also be understood that one or more operations of the flowchart, and combinations of blocks or operations in the flowchart, may be implemented by special purpose hardware-based computer systems and/or processors which perform the specified functions, or combinations of special purpose hardware and program code instructions.

The above described functions may be carried out in many ways. For example, any suitable means for carrying out each of the functions described above may be employed to carry out embodiments of the invention. In one embodiment, a suitably configured processor (for example, the processor 210, processor 310, and/or processor 410) may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium (for example, the memory 212, memory 312, and/or memory 412), and computer-readable program code portions, such as a series of computer instructions, embodied in the computer-readable storage medium.

In an example embodiment, a method is provided, which comprises receiving a message comprising an indication of one or more hardware requirements associated with a service. The method of this example embodiment further comprises determining one or more hardware attributes related to the one or more hardware requirements. The method of this example embodiment may further comprise evaluating whether the one or more hardware attributes satisfy the one or more hardware requirements. The service of this example method may be delivered via a web based portal.

The method may further comprise providing for transmission of a report. The report may comprise an indication of whether the one or more hardware attributes satisfy the one or more hardware requirements of the service. The method may additionally comprise providing access to the service upon a determination that the one or more hardware attributes satisfy the hardware requirements of the service. As another example, the method may comprise restricting access to the service upon a determination that the one or more hardware attributes do not satisfy the hardware requirements of the service. Additionally, receiving a message comprising an indication of one or more hardware requirements associated with a service may occur in response to a user selecting a service via the web based portal. As another example, receiving a message comprising an indication of one or more hardware requirements associated with a service may occur in response to a user logging on to the web based portal.

In another example embodiment, an apparatus comprising at least one processor and at least one memory storing computer program code is provided. The at least one memory and stored computer program code may be configured, with the at least one processor, to cause the apparatus of this example embodiment to at least receive a message comprising an indication of one or more hardware requirements associated with a service. The at least one memory and stored computer program code may be configured, with the at least one processor, to further cause the apparatus of this example embodiment to determine one or more hardware attributes related to the one or more hardware requirements. The at least one memory and stored computer program code may be configured, with the at least one processor, to additionally cause the apparatus of this example embodiment to evaluate whether the one or more hardware attributes satisfy the one or more hardware requirements. The service of this example may be delivered via a web based portal.

The at least one memory and stored computer program code may be configured, with the at least one processor, to further cause the apparatus of this example embodiment to provide for transmission of a report. The report may comprise an indication of whether the one or more hardware attributes satisfy the one or more hardware requirements of the service. The at least one memory and stored computer program code may be configured, with the at least one processor, to additionally cause the apparatus of this example embodiment to provide access to the service upon a determination that the one or more hardware attributes satisfy the hardware requirements of the service. As another example, the at least one memory and stored computer program code may be configured, with the at least one processor, to cause the apparatus of this example embodiment to restrict access to the service upon a determination that the one or more hardware attributes do not satisfy the hardware requirements of the service. Additionally, receiving a message comprising an indication of one or more hardware requirements associated with a service may occur in response to a user selecting a service via the web based portal. As another example, receiving a message comprising an indication of one or more hardware requirements associated with a service may occur in response to a user logging on to the web based portal.

In another example embodiment, a computer program product is provided. The computer program product of this example embodiment may include at least one computer-readable storage medium having computer-readable program instructions stored therein. The program instructions of this example embodiment may comprise program instructions configured to receive a message comprising an indication of one or more hardware requirements associated with a service. The program instructions of this example embodiment may further comprise program instructions configured to determine one or more hardware attributes related to the one or more hardware requirements. The program instructions of this example embodiment may additionally comprise program instructions configured to evaluate whether the one or more hardware attributes satisfy the one or more hardware requirements. The service of this example may be delivered via a web based portal.

The program instructions of this example embodiment may further comprise program instructions configured to provide for transmission of a report. The report may comprise an indication of whether the one or more hardware attributes satisfy the one or more hardware requirements of the service. The program instructions of this example embodiment may additionally comprise program instructions configured to provide access to the service upon a determination that the one or more hardware attributes satisfy the hardware requirements of the service. As another example, the program instructions of this example embodiment may comprise program instructions configured to restrict access to the service upon a determination that the one or more hardware attributes do not satisfy the hardware requirements of the service. Additionally, receiving a message comprising an indication of one or more hardware requirements associated with a service may occur in response to a user selecting a service via the web based portal. As another example, receiving a message comprising an indication of one or more hardware requirements associated with a service may occur in response to a user logging on to the web based portal.

In another example embodiment, an apparatus is provided, which may comprise means for receiving a message comprising an indication of one or more hardware requirements associated with a service. The apparatus of this example embodiment may further comprise means for determining one or more hardware attributes related to the one or more hardware requirements. The apparatus of this example embodiment may additionally comprise means for evaluating whether the one or more hardware attributes satisfy the one or more hardware requirements. The service of this example may be delivered via a web based portal.

The apparatus of this example embodiment may further comprise means for providing for transmission of a report. The report may comprise an indication of whether the one or more hardware attributes satisfy the one or more hardware requirements of the service. The apparatus of this example embodiment may also comprise means for providing access to the service upon a determination that the one or more hardware attributes satisfy the hardware requirements of the service. As another example, the apparatus of this example embodiment may comprise means for restricting access to the service upon a determination that the one or more hardware attributes do not satisfy the hardware requirements of the service. Additionally, receiving a message comprising an indication of one or more hardware requirements associated with a service may occur in response to a user selecting a service via the web based portal. As another example, receiving a message comprising an indication of one or more hardware requirements associated with a service may occur in response to a user logging on to the web based portal.

In an example embodiment, a method is provided, which may comprise associating one or more hardware requirements with one or more respective services. The method of this example embodiment may further comprise receiving a request for a service. The method of this example embodiment may further comprise providing for transmission of a message indicating the one or more hardware requirements associated with the requested service. Additionally, the method of this example embodiment may comprise receiving one or more hardware attributes related to the one or more hardware requirements. The method of this example embodiment may further comprise evaluating whether the one or more hardware attributes satisfy the one or more hardware requirements.

The service of this example method may be delivered via a web based portal. The method of this example embodiment may further comprise providing access to the service upon a determination that the one or more hardware attributes satisfy the hardware requirements of the service. As another example, the method of this example embodiment may further comprise restricting access to the service upon a determination that the one or more hardware attributes do not satisfy the hardware requirements of the service.

In another example embodiment, an apparatus comprising at least one processor and at least one memory storing computer program code is provided. The at least one memory and stored computer program code may be configured, with the at least one processor, to cause the apparatus of this example embodiment to at least associate one or more hardware requirements with one or more respective services. The at least one memory and stored computer program code may be configured, with the at least one processor, to further cause the apparatus of this example embodiment to receive a request for a service. The at least one memory and stored computer program code may be configured, with the at least one processor, to additionally cause the apparatus of this example embodiment to provide for transmission of a message indicating the one or more hardware requirements associated with the requested service. The at least one memory and stored computer program code may be configured, with the at least one processor, to further cause the apparatus of this example embodiment to receive one or more hardware attributes related to the one or more hardware requirements. The at least one memory and stored computer program code may be configured, with the at least one processor, to additionally cause the apparatus of this example embodiment to evaluate whether the one or more hardware attributes satisfy the one or more hardware requirements.

The service of this example may be delivered via a web based portal. The at least one memory and stored computer program code may be configured, with the at least one processor, to further cause the apparatus of this example embodiment to provide access to the service upon a determination that the one or more hardware attributes satisfy the hardware requirements of the service. As another example, the at least one memory and stored computer program code may be configured, with the at least one processor, to cause the apparatus of this example embodiment to restrict access to the service upon a determination that the one or more hardware attributes do not satisfy the hardware requirements of the service.

In another example embodiment, a computer program product is provided. The computer program product of this example embodiment may include at least one computer-readable storage medium having computer-readable program instructions stored therein. The program instructions of this example embodiment may comprise program instructions configured to associate one or more hardware requirements with one or more respective services. The program instructions of this example embodiment may further comprise program instructions configured to receive a request for a service. The program instructions of this example embodiment may additionally comprise program instructions configured to provide for transmission of a message indicating the one or more hardware requirements associated with the requested service. The program instructions of this example embodiment may further comprise program instructions configured to receive one or more hardware attributes related to the one or more hardware requirements. The program instructions of this example embodiment may additionally comprise program instructions configured to evaluate whether the one or more hardware attributes satisfy the one or more hardware requirements.

The service of this example may be delivered via a web based portal. The program instructions of this example embodiment may further comprise program instructions configured to provide access to the service upon a determination that the one or more hardware attributes satisfy the hardware requirements of the service. As another example, the program instructions of this example embodiment may comprise program instructions configured to restrict access to the service upon a determination that the one or more hardware attributes do not satisfy the hardware requirements of the service.

In another example embodiment, an apparatus is provided, which may comprise means for associating one or more hardware requirements with one or more respective services. The apparatus of this example embodiment may further comprise means for receiving a request for a service. The apparatus of this example embodiment may additionally comprise means for providing for transmission of a message indicating the one or more hardware requirements associated with the requested service. The apparatus of this example embodiment may further comprise means for receiving one or more hardware attributes related to the one or more hardware requirements. The apparatus of this example embodiment may additionally comprise means for evaluating whether the one or more hardware attributes satisfy the one or more hardware requirements.

The service of this example may be delivered via a web based portal. The apparatus of this example embodiment may further comprise means for providing access to the service upon a determination that the one or more hardware attributes satisfy the hardware requirements of the service. As another example, the apparatus of this example embodiment may further comprise means for restricting access to the service upon a determination that the one or more hardware attributes do not satisfy the hardware requirements of the service.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed is:

1. A method for determining hardware requirements of one or more services for a terminal apparatus, which method is performed by at least one of a processor and a computer program product, which method comprises:
   receiving a message at the terminal apparatus comprising an indication of one or more hardware requirements associated with one or more services;
   determining one or more hardware attributes associated with the terminal apparatus related to the one or more hardware requirements;
   evaluating whether the one or more hardware attributes satisfy the one or more hardware requirements and, if so, receiving one or more services at the terminal apparatus via a web based portal;
   restricting access to one or more of the services upon a determination that the one or more hardware attributes do not satisfy the hardware requirements of the respective service; and
   overriding the restriction of access to one or more of the services despite the determination that the one or more hardware attributes do not satisfy the hardware requirements of the respective service.

2. The method of claim 1 further comprising the step of providing for transmission of a report that comprises an indication of whether the one or more hardware attributes satisfy the one or more hardware requirements of one or more services.

3. The method of claim 1 wherein the step of restricting access further comprises restricting access for those hardware attributes that are static throughout a session with the terminal apparatus.

4. The method of claim 3 wherein the step receiving the one or more services at a terminal apparatus via a web based portal further comprises receiving a warning notification to adjust a hardware attribute that is not static throughout a session to meet a corresponding hardware requirement.

5. The method of claim 1 wherein the step of receiving a message comprising an indication of one or more hardware requirements associated with one or more services occurs in response to a user of the terminal apparatus selecting one or more services via the web based portal.

6. The method of claim 1, wherein the step of receiving a message comprising an indication of one or more hardware requirements associated with one or more services occurs in response to a user of the terminal apparatus logging on to the web based portal.

7. The method of claim 1, wherein the step of receiving one or more services at the terminal apparatus via a web based portal further comprises receiving an application in an executable file at the terminal apparatus.

8. The method of claim 1, wherein the step of receiving one or more services at the terminal apparatus via a web based portal further comprises receiving directions for executing an application stored at the terminal apparatus.

9. An apparatus for determining hardware requirements of one or more services, the apparatus comprising:
   at least one processor;
   at least one memory storing computer program code; and
   wherein the at least one memory and at least stored computer program code are configured, with the at least one processor, to cause the apparatus to,
   receive a message comprising an indication of one or more hardware requirements associated with one or more services,
   determine one or more hardware attributes associated related to the one or more hardware requirements,
   evaluate whether the one or more hardware attributes satisfy the one or more hardware requirements, and
   receive one or more services via a web based portal;

restrict access to one or more of the services upon a determination that the one or more hardware attributes do not satisfy the hardware requirements of the respective service; and override the restriction of access to one or more of the services despite the determination that the one or more hardware attributes do not satisfy the hardware requirements of the respective service.

10. The apparatus of claim 9 wherein the at least one memory and at least one stored computer program code are configured, with the at least one processor, to further cause the apparatus to provide for transmission of a report comprising an indication of whether the one or more hardware attributes satisfy the one or more hardware requirements of one or more services.

11. The apparatus of claim 10, wherein the at least one memory and at least one stored computer program code are configured, with the at least one processor, to additionally cause the apparatus to provide access to one or more services upon a determination that the one or more hardware attributes satisfy the hardware requirements of one or more services.

12. The apparatus of claim 9, wherein the at least one memory and at least one stored computer program code are configured, with the at least one processor, to receive a message comprising an indication of one or more hardware requirements associated with one or more services in response to a user of the apparatus selecting one or more services via the web based portal.

13. The apparatus of claim 9 wherein the at least one memory and at least one stored computer program code are configured, with the at least one processor, to receive a message comprising an indication of one or more hardware requirements associated with one or more services in response to a user of the apparatus logging on to the web based portal.

14. The apparatus of claim 9 further comprising one or more of the hardware attributes of:
current central processing unit (CPU) utilization,
maximum average CPU utilization,
chipset,
chip support for one time password (OTP),
charging status,
power source,
battery charge percentage,
battery time remaining,
current memory usage,
current memory available,
total memory installed,
available hard drive space,
total hard drive space,
network bandwidth,
network connection type,
video card model,
current screen resolution,
maximum screen resolution,
supported screen resolutions,
mouse availability,
keyboard availability,
speaker availability, and
microphone availability.

15. A computer program product for determining hardware requirements of one or more services, the computer program product comprising:
at least one non-transitory computer-readable medium having computer-readable program instructions stored therein, the program instructions configured to,
receive a message comprising an indication of one or more hardware requirements associated with the one or more services,
determine one or more hardware attributes related to the one or more hardware requirements,
evaluate whether the one or more hardware attributes satisfy the one or more hardware requirements, and
receive one or more services via a web based portal;
restrict access to one or more of the services upon a determination that the one or more hardware attributes do not satisfy the hardware requirements of the respective service; and
override the restriction of access to one or more of the services despite the determination that the one or more hardware attributes do not satisfy the hardware requirements of the respective service.

16. The computer program product of claim 15 wherein the program instructions are further configured to provide for transmission of a report comprising an indication of whether the one or more hardware attributes satisfy the one or more hardware requirements of the one or more services.

17. The computer program product of claim 15 wherein the program instructions are further configured to provide access to one or more service upon a determination that the one or more hardware attributes satisfy the hardware requirements of the one or more services.

18. The computer program product of claim 15 wherein the program instructions are further configured to receive a message comprising an indication of one or more hardware requirements associated with one or more services in response to a user of the computer program product selecting one or more services via the web based portal.

19. The computer program product of claim 15 wherein the program instructions are further configured to receive a message comprising an indication of one or more hardware requirements associated with a service in response to a user of the computer program product logging on to the web based portal.

* * * * *